United States Patent [19]
Gioutsos et al.

[11] Patent Number: 5,337,238
[45] Date of Patent: Aug. 9, 1994

[54] SYSTEM AND METHOD FOR ACTUATING VEHICLE SAFETY DEVICE USING DAMPED MEASURES

[75] Inventors: Tony Gioutsos, Brighton; Michael A. Piskie, Bloomfield Hills, both of Mich.

[73] Assignee: Automotive Systems Laboratory, Inc., Farmington Hills, Mich.

[21] Appl. No.: 773,676

[22] Filed: Oct. 8, 1991

[51] Int. Cl.⁵ .............................................. B60R 21/02
[52] U.S. Cl. .................. 364/424.05; 180/282; 280/735; 307/10.1; 340/436
[58] Field of Search .......... 364/424.01, 424.05; 307/10.1; 180/268, 271, 282; 280/728, 734, 735; 340/436, 669

[56] References Cited

U.S. PATENT DOCUMENTS

| | | | |
|---|---|---|---|
| 3,911,391 | 10/1975 | Held et al. ................. | 280/735 X |
| 4,975,850 | 12/1990 | Diller .......................... | 364/424.05 |
| 4,984,464 | 1/1991 | Thomas et al. ............. | 340/669 X |
| 4,985,835 | 1/1991 | Sterler et al. .............. | 364/424.05 |
| 4,994,972 | 2/1991 | Diller .......................... | 364/424.05 |
| 5,021,678 | 6/1991 | Diller .......................... | 307/10.1 |
| 5,040,118 | 8/1991 | Diller .......................... | 364/424.05 |
| 5,067,745 | 11/1991 | Yoshikawa ................ | 280/735 |
| 5,073,860 | 12/1991 | Blackburn et al. ......... | 364/424.05 |
| 5,157,268 | 10/1992 | Spies et al. ................ | 307/10.1 |
| 5,173,614 | 12/1992 | Woehrl et al. ............. | 307/10.1 |
| 5,182,459 | 1/1993 | Okano et al. .............. | 307/10.1 |
| 5,229,943 | 7/1993 | Eigler et al. .............. | 364/424.05 |

Primary Examiner—Thomas G. Black
Assistant Examiner—Collin W. Park
Attorney, Agent, or Firm—Lyon & Delevie

[57] ABSTRACT

A system and method for triggering deployment of a vehicle air bag in response to a crash or sudden vehicle deceleration responsive to values for modified velocity, predicted acceleration, high-frequency velocity, and high-variance velocity. The air bag is triggered when at least two of the values for modified velocity, predicted acceleration, high-frequency velocity, and high-variance velocity exceed their respective thresholds.

31 Claims, 9 Drawing Sheets

SYSTEM AND METHOD FOR ACTUATING VEHICLE SAFETY DEVICE USING DAMPED MEASURES

BACKGROUND OF THE INVENTION

The instant invention relates to systems and methods for triggering the deployment or actuation of vehicular safety devices and, more particularly, to a prediction-based system and method which anticipates conditions requiring such deployment or actuation of the safety devices to provide superior response thereto.

A variety of systems for actuating vehicular safety devices are well known in the art. Such systems are used to sense a crash condition and, in response to such a condition, to actuate an air bag, or lock a seat belt, or actuate a pretensioner for a seat belt retractor. Typically, the safety device is actuated or deployed into its protective position when an impact exceeding a predetermined magnitude is detected by the actuating system.

One prior art method for crash detection integrates the output of an electronic acceleration sensor over time and compares the result against a time-varying threshold velocity. A major drawback of this method is its need for determining when to start running the time-varying threshold, i.e., when the reference time for the time-varying threshold is to be reset to zero time. Another problem associated with the integration method of crash detection is that crash severity cannot be determined early enough for high-speed angular, partial barrier, or pole crashes. Moreover, the wide "grey area" between "fire" and "no-fire" conditions for low-speed crash conditions often results in an inadvertent deployment of the safety device when deployment is unnecessary, or nondeployment of the safety device when deployment is necessary.

Still further, raw velocity is not a particularly good measure of the effect of a crash on the human body. One criterion often employed with the integration method is the "5 inch—30 msec" rule, which states that an air bag should fire 30 msec prior to the time in which the passenger to be protected thereby will have moved 5 inches. Unfortunately, the passenger may well move forward 5 inches during a normal vehicle braking pattern—a condition in which air bag deployment would not only be undesirable but extremely hazardous.

Other prior art methods for assessing crash severity attempt to deemphasize the use of simple velocity calculations and instead calculate values for vehicle "jerk," i.e., the slope of the acceleration data; or the energy dissipated during a crash. Unfortunately, experience has shown that jerk alone is incapable of properly discriminating between conditions requiring actuation of a vehicle safety device and conditions where such actuation is either unnecessary or undesirable. Moreover, the "energy method" continues to utilize velocity information, resulting in the same types of deployment problems and slow response times as are encountered with the integration method. Additionally, the energy method is further limited in that it is accurate only over short time intervals.

SUMMARY OF THE INVENTION

It is an object of the instant invention to provide a prediction-based system and method for crash detection which can reliably and instantaneously detect crash severity earlier than an integration, jerk, or energy algorithm, and over a wider variety of circumstances and a wider time interval than is currently possible.

Another object of the instant invention is to provide a system and method for crash detection that is event-based rather than timer-based.

Another object of the instant invention is to provide a system and method for crash detection employing a "damping" for each significant physically-based measure utilized thereby.

The instant system for actuating a vehicle safety device in the event of a vehicle crash or sudden vehicle deceleration comprises means for generating sampled data representative of the instantaneous acceleration of the vehicle; a RAM for storing consecutive values of the acceleration data; means for calculating a low-variance jerk value from the stored data set; means for calculating a high-variance jerk value from the stored data set; means for calculating at least one damped velocity value from the stored data set; means for calculating a predicted acceleration value using the low-variance jerk value; means for calculating a high-frequency velocity value using the low-variance jerk value; means for calculating a high-variance velocity value using the high-variance jerk value; and means responsive to the values for modified velocity, predicted acceleration, high-frequency velocity, and high-variance velocity for actuating the vehicle safety device when at least two of the values exceed threshold values therefor.

BRIEF DESCRIPTION OF THE DRAWINGS

FIG. 2 is a flow diagram illustrating the primary steps of the instant method;

DETAILED DESCRIPTION OF THE PREFERRED EMBODIMENT OF THE INVENTION

The goal of a prediction-based crash discriminator is to accurately predict when a severe crash is going to occur from present-received data. This contrasts with known methods of crash detection which instead rely on a certain change in some physical quantity while varying a corresponding threshold value therefor with time to converge to a solution. Accordingly, the instant invention seeks to predict where the acceleration is going and verify that the prediction is on target.

One feature of the instant system and method is the use of damping for each physical measure upon which crash discrimination is based. As a result, each significant physically-based measure is removed from the crash detection algorithm in a gradual way, in contrast to the rather abrupt manner typical of prior art algorithms. Preferably, the damping is event-varying, whereby the amount of damping increases or decreases depending upon the frequency and/or significance of various events rather than on a clock-based measure or sliding window. The use of damped physical measures provides useful values for longer periods of time than the sliding window techniques typical of prior art methods, wherein a value can last only as long as the window length. For example, when a vehicle encounters a high amplitude acceleration pulse, there is normally a delay in velocity response. The sliding window technique or clock-based damping will typically operate to reduce or even eliminate the high vehicle acceleration experienced by the vehicle. In contrast, the instant fully-damped crash discriminator will maintain significant values for a period sufficient to incorporate same in a useful discrimination algorithm. The use of damping to maintain critical values for longer periods becomes particularly important during long crash pulse waveforms requiring deployment of the passenger safety restraint, or in concatenation of rough road with low MPH crashes which also require restraint deployment or actuation.

While instantaneous vehicle velocity is appropriately classed as a physically-based measure, velocity values may also be viewed as a memory of past events, i.e., a measure of past history. Unfortunately, it does not contain all of the past history information but rather contains only the sum of all prior acceleration values. Thus, while instantaneous velocity is important to crash discrimination, other measures are preferably also used to give additional information on past history.

Under the instant invention, the instantaneous slope or jerk of the acceleration data is used both as a prediction measure and as a means for breaking velocity values, i.e., past history sums, into frequency bands. Thus, a high frequency value is indicated when the absolute value of the jerk is great. Stated another way, a past history measure of high frequency activity may thus be obtained by summing velocity values only when the absolute value of the instantaneous slope is relatively great. Similarly, the past history may be broken into N frequency bands, where the absolute values of the instantaneous slope are used as "cutoff" frequencies for each band.

The instantaneous acceleration may also be used as a measure indicative of high-acceleration past history. Specifically, nominal acceleration value thresholds may be assigned, the crossing of which may further indicate the need for safety restraint deployment. Also useful in crash discrimination is the output of two rank-order filters, one of which provides the lowest rank value and one of which provides the highest rank value among a given set of velocity values. The outputs from the rank-order filters are thereafter compared to obtain variance information useful in crash discrimination. For example, in a no-fire low MPH crash, the values for acceleration remains essentially constant over a relatively long period of time, whereas for pole and offset crashes, the values for vehicle acceleration continue to vary over time. Where the difference between the highest ranked value and the lowest ranked value is small, the low MPH crash is indicated; where a larger difference exists between the highest ranked and the lowest ranked value, an offset or pole crash is indicated.

Each of the above measures is preferably weighted to obtain smoother results. For example, in copending U.S. patent application Ser. No. 07/709,891 entitled "Power Rate System and Method for Actuating Vehicle Safety Device," filed Jun. 4, 1991, an approximate value for the rate of change of power was obtained by multiplying instantaneous velocity times jerk. Thus, under my power rate method, jerk values are essentially weighted by velocity to obtain a smoother estimate of jerk for subsequent comparison to a given threshold.

In accordance with another feature of the instant invention, wherein at least one threshold value for instantaneous slope is utilized to partition the acceleration sum into a high frequency band, the resulting value for high frequency acceleration is thereafter further weighted by multiplying it with, or otherwise adding it to, the slope. As a result, a higher jerk value will provide still higher acceleration values for use in crash discrimination.

As in the above-described power rate method, the instant system and method preferably use damped or modified velocity in place of absolute time, thereby providing an event-based crash discriminator which operates without time-based start-up criteria, i.e., without having to detect the time-based beginning of any given event.

Figure 1A:
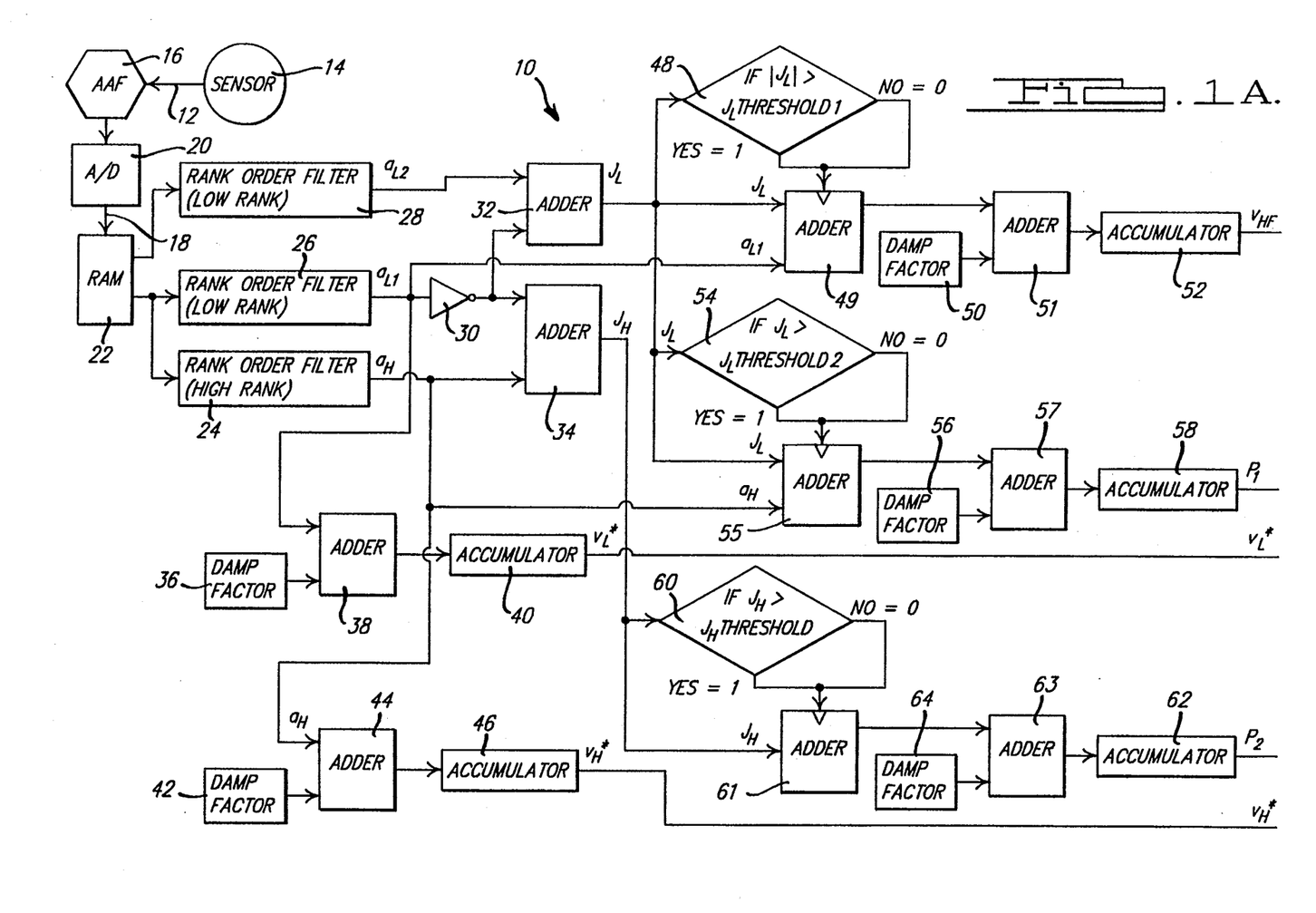
FIGS. 1A and 1B show a diagrammatic schematic of an exemplary crash discriminator constructed in accordance with the instant invention.

Referring now to the drawings, a crash discriminator 10 constructed in accordance with the instant invention is shown in FIG. 1. Raw acceleration data 12 generated by an acceleration sensor 14 is passed through an anti-alias filter 16 and thereafter converted to digital data 18 in digital-to-analog converter 20. Successive values of the digital data 18 are stored in a RAM 22 of length N. The resulting data set is divided in half, with the most recent half sent to a first and second rank-order filter 24 and 26. The first rank-order filter 24 thereafter outputs a relatively high-ranked acceleration value $a_H$ from the older or "past" half of the stored data set corresponding to rank $R_1$ thereof, i.e., the highest-ranked value of the data set. The second rank-order filter 26 outputs a relatively low-ranked acceleration value $a_{L1}$ from the past half of the stored data set corresponding to rank $R_2$ thereof that data set, e.g., the lowest-ranked value of the data set. The most recent or current half of the data set is sent to a third rank-order filter 28 which outputs a second relatively low-ranked acceleration value $a_{L2}$ from the current half of the stored data set corresponding to rank $R_2$ thereof. The rank-order filters remove any wild variance data, such as high-frequency noise, EMI, or spiky crash data, while retaining significant "edge data," i.e., data relating to a slant-up or a step function.

The past lowest-ranked acceleration value $a_{L1}$ is negatived in inverter 30 and thereafter added to the current lowest-ranked acceleration value $a_{L2}$ in adder 32 to obtain the instantaneous slope or jerk $J_L$ of the stored acceleration data. The negatived past lowest-ranked acceleration value $a_{L1}$ from inverter 30 is also added to the past highest-ranked acceleration value $a_H$ in adder 34 to obtain a value for the high variance jerk $J_H$ of the stored acceleration data. The latter jerk value reveals the difference between the maximum and minimum values output by rank-order filters 24 and 26; generally speaking, crash waveforms characteristically have higher variance.

Meanwhile, the past lower-ranked acceleration value $a_{L1}$ is "damped" by adding thereto an appropriate damping factor 36 in adder 38. The damping factor may be a constant, e.g., equal to the nominal acceleration that an average vehicle passenger could himself resist without the aid of a passenger safety restraint, as disclosed in copending U.S. patent application Ser. No. 07/773,017, entitled "Predictor/Check Crash Discriminator" and filed Oct. 8, 1991. The damping factor may alternatively be a sliding window or, most preferably, a function of the event itself, i.e., a function of jerk, acceleration, velocity, etc. Damping under the instant invention allows significant acceleration data to be stored for a longer period of time, thereby increasing discriminator response thereto. The resulting modified lower-ranked acceleration value is thereafter integrated (summed) in a first accumulator 40 to obtain a first modified velocity value $v_L^*$.

Similarly, the higher-ranked acceleration value $a_H$ is damped by adding thereto an appropriate damping factor 42 in adder 44. The resulting modified higher-ranked acceleration value is likewise integrated (summed) in a second accumulator 46 to obtain a second modified velocity value $v_H^*$.

The absolute value of the jerk $J_L$ is then compared to a first threshold $J_L$THRESHOLD1 therefor at 48. If the absolute value of the jerk $J_L$ exceeds its first threshold $J_L$THRESHOLD1, the jerk $J_L$ is weighted in adder 49 by adding thereto the past lowest-ranked acceleration value $a_{L1}$, whereby less arbitrary results are obtained. The resulting weighted jerk value is damped in adder 51 using an appropriate damping factor 50 and thereafter summed in accumulator 52 to obtain a value for the high-frequency velocity $v_{HF}$ representative of past history. If the absolute value of the jerk $J_L$ fails to exceed its first threshold $J_L$THRESHOLD, the damp factor 50 is itself subtracted from the high-frequency past history data value $v_{HF}$ accumulated in accumulator 52.

The jerk $J_L$ itself is also compared to a second, small threshold value $J_L$THRESHOLD2 at 54. If the jerk $J_L$ is greater than this second threshold $J_L$THRESHOLD2, the jerk $J_L$ is weighted in adder 52 by adding thereto the past highest-ranked acceleration value $a_H$; and the resulting weighted jerk value is damped in adder 57 using an appropriate damping factor 56 and thereafter summed in accumulator 58 to obtain a predicted value for future acceleration $P_1$. If the value of the jerk $J_L$ otherwise fails to exceed its threshold, the damp factor 56 is itself subtracted from the predicted value for future acceleration $P_1$ accumulated in accumulator 58.

Similarly, the high variance jerk $J_H$ is compared to a relatively small threshold value $J_H$THRESHOLD at 60. As with the jerk $J_L$ above, if the high variance jerk $J_H$ exceeds its threshold $J_H$THRESHOLD, it is passed through adder 61 and is summed with the accumulated value in accumulator 62 after being damped using a damping factor 64. If the high variance jerk $J_H$ does not exceed its threshold $J_H$THRESHOLD, the accumulation is damped, i.e., only the typically negative damping factor 64 is added to the accumulated value in accumulator 62. The resulting accumulated value represents the high variant past history $P_2$.

As noted hereinabove, the first and second values for modified velocity value $v_L^*$ and $v_H^*$ calculated hereinabove are used in place of "time". Thus, once the first modified velocity value $v_L^*$ exceeds a first "time" threshold TIME1, then the first predicted acceleration value $P_1$ and the high variant past history value $P_2$ are each compared to a first set of thresholds therefor, namely, $P_1$THRESHOLD1 and $P_2$THRESHOLD1, respectively. As soon as their respective thresholds are exceeded, flag T1 is set to 1. It is noted that, i.e., reset to 0, only flag T1 will only get turned off if and when the modified velocity value $v_L^*$ falls below the first "time" threshold.

Similarly, the second modified velocity value $v_H^*$ is compared to second "time" threshold TIME2. If the second modified velocity value $v_H^*$ exceeds TIME2, then the predicted acceleration value $P_1$ is compared to a second threshold $P_1$THRESHOLD2 and the high-frequency velocity $v_{HF}$ is compared to a threshold $v_{HF}$THRESHOLD therefor. As soon as these respective thresholds are exceeded, flag T2 is set to 1.

It is significant to note that flag T1 and flag T2 can thus be set to 1 at different absolute times. Of course, from an "event" perspective, each is set at TIME1 and TIME2, respectively.

Figure 1B:
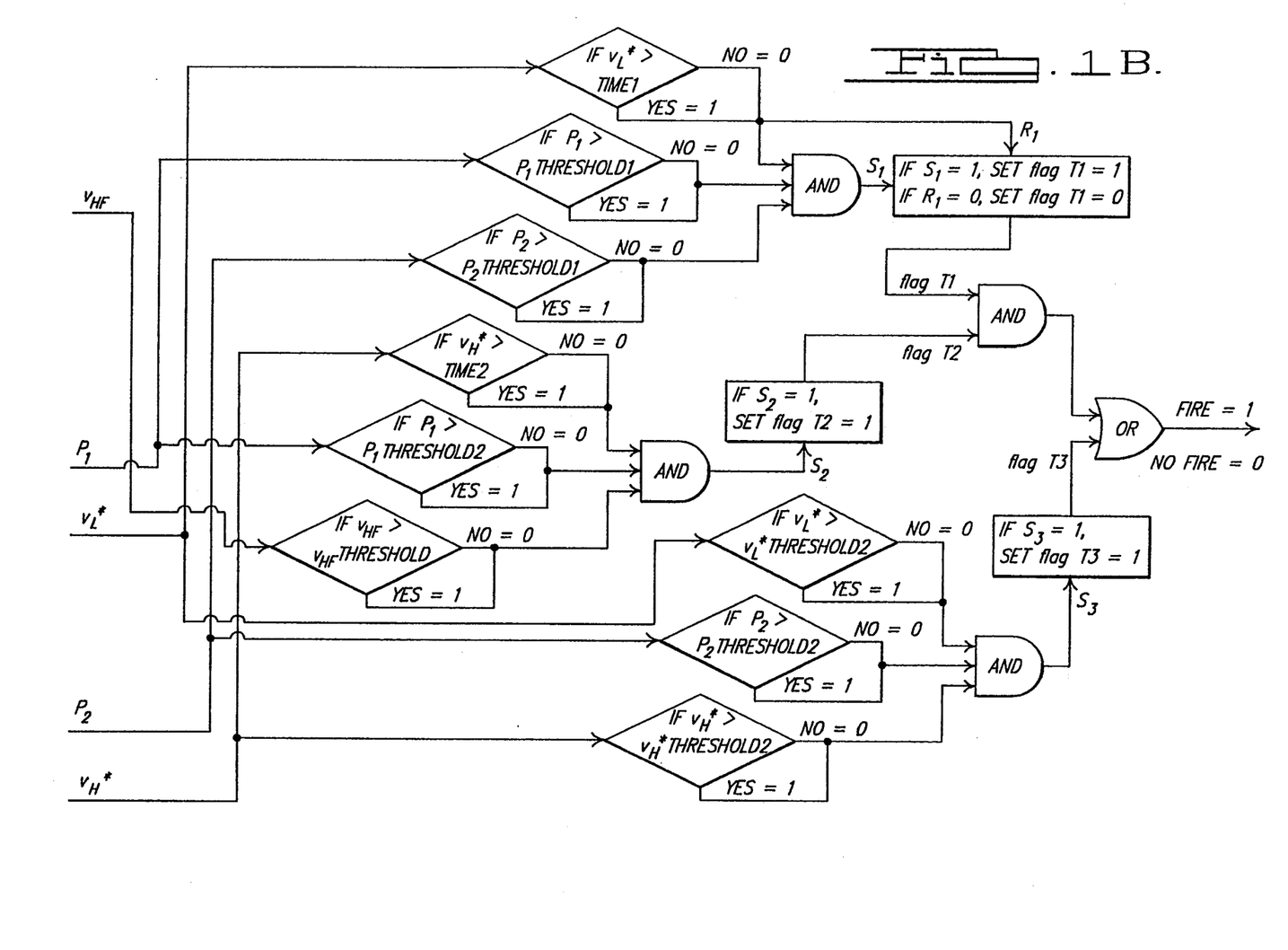

In addition to the above described firing condition, the instant system will also initiate restraint deployment in crash situations which require deployment but are not necessarily detectable by the above described firing condition. Referring to FIG. 1B, the high velocity value $v_H^*$, the low velocity value $v_L^*$ and the high variant past history value $P_2$ are compared to a second set of thresholds, namely, $v_H^*$THRESHOLD2, $v_L^*$THRESHOLD2 and $P_2$THRESHOLD2, respectively. If each exceeds its respective threshold, flag T3 is set to 1, thereby causing actuation of the passenger restraint system.

FIG. 2 generally depicts the overall operational flow of the present invention as shown in FIGS. 1A and 1B. When the acceleration information is received, it is filtered 16 and converted to digital data 20. From there, the transitory jerk $J_L$ is calculated in calculation step 110; the transitory high variance jerk $J_H$ is calculated in calculation step 112; and the low- and high-rank velocities $v_L^*$ and $v_H^*$ are calculated in calculation step 114. The transitory jerk $J_L$ is thereafter used to calculate an acceleration prediction value $P_1$ in calculation step 116 and a high frequency acceleration past history $v_{HF}$ in calculation step 118. The high variance jerk $J_H$ is used to calculate a high variance acceleration past history $P_2$ in calculation step 120. Each of these values $P_1$, $v_{HF}$, $P_2$, $v_L^*$ and $v_H^*$ is then checked against a respective threshold therefor in decision boundaries comparison step 122 to determine if there is a fire or no-fire condition for the air bag or passenger restraint controlled by the instant system. As described in relation to FIGS. 1A and 1B hereinabove, each of these calculated values is a physically-based measure, with the low- and high-rank velocities $v_L^*$ and $v_H^*$ also being used as time control measures.

Figure 3:
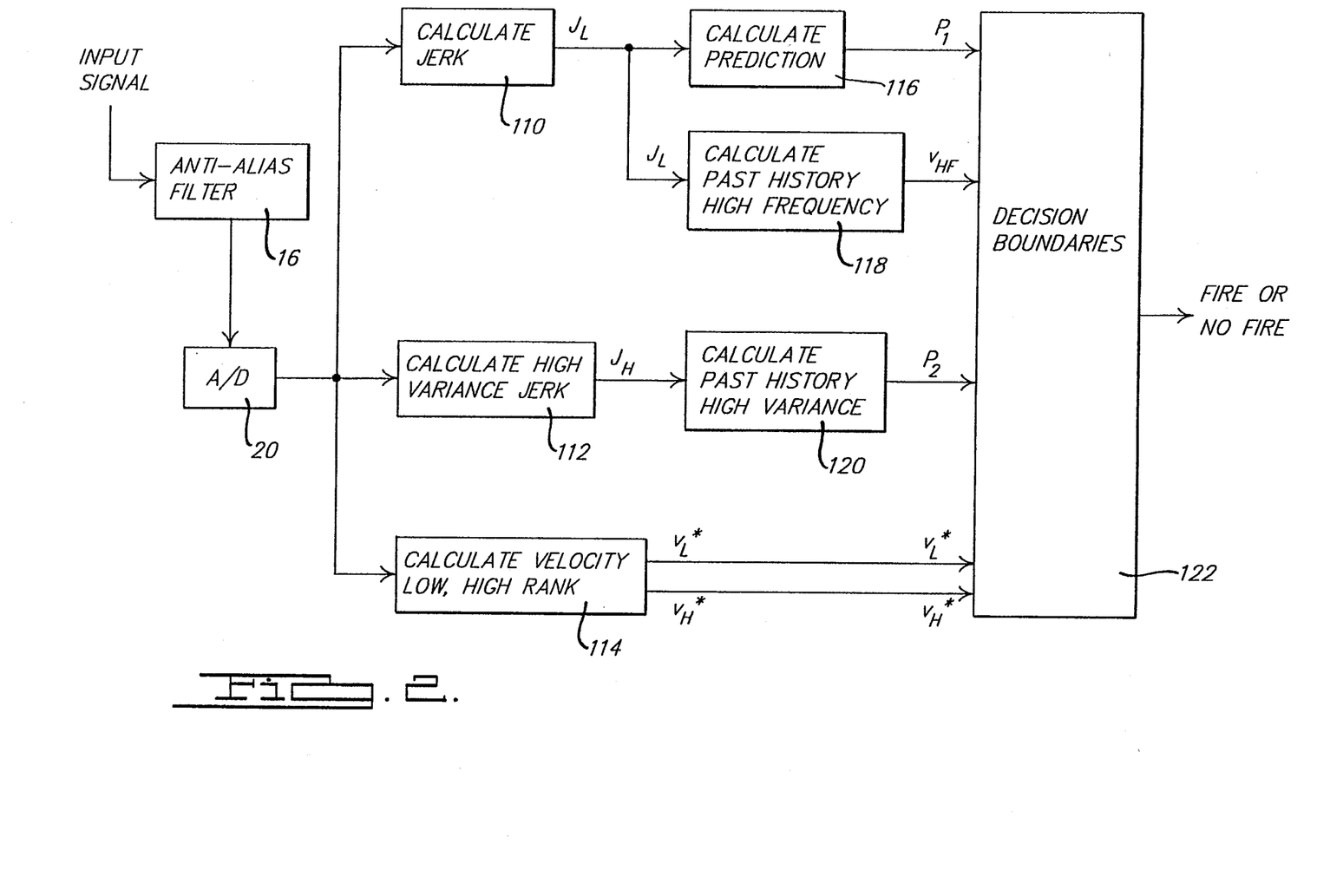
FIGS. 3A–3D, 4A–4D and 5A–5D are plots of (A) log high-rank velocity versus time, (B) log high-frequency velocity versus the first predicted acceleration value estimated from the weighted value of jerk, (C) log low-rank velocity versus time, and (D) velocity variance versus the first predicted acceleration value, for three different crash conditions.
Figure 3A:
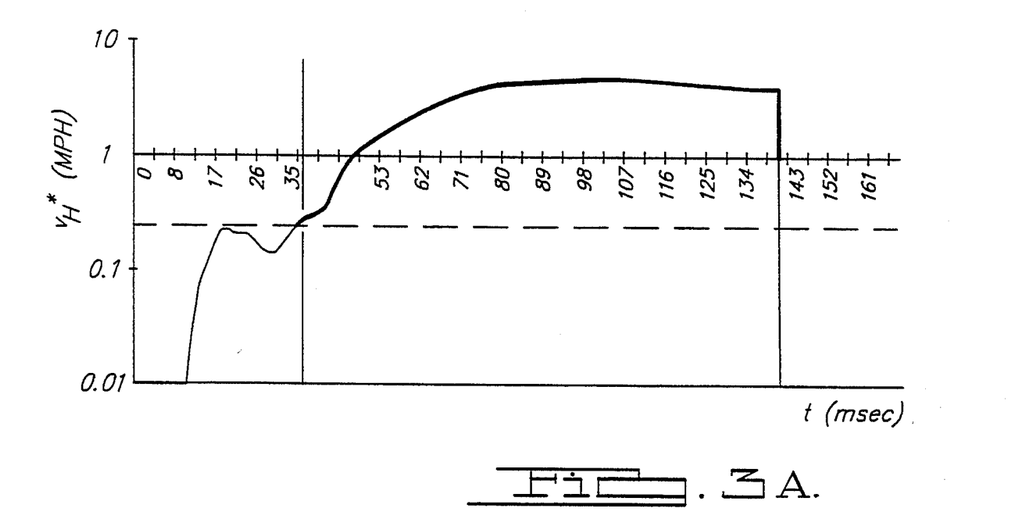
Figure 3B:
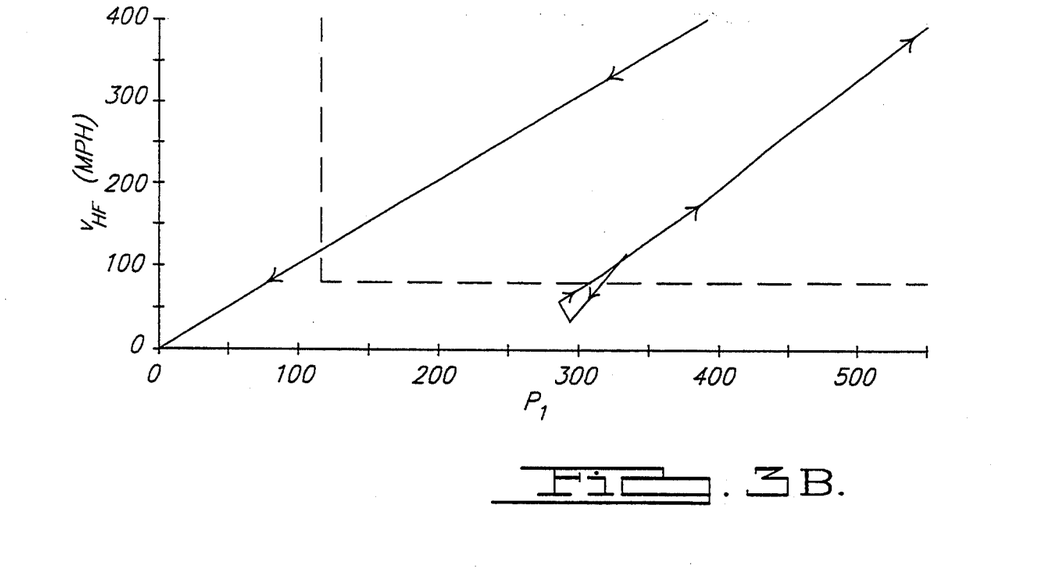
Figure 3C:
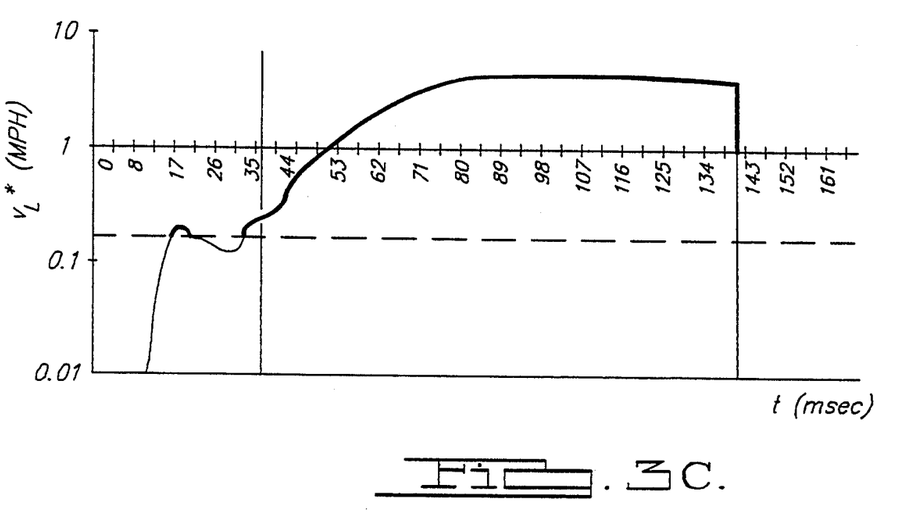
Figure 3D:
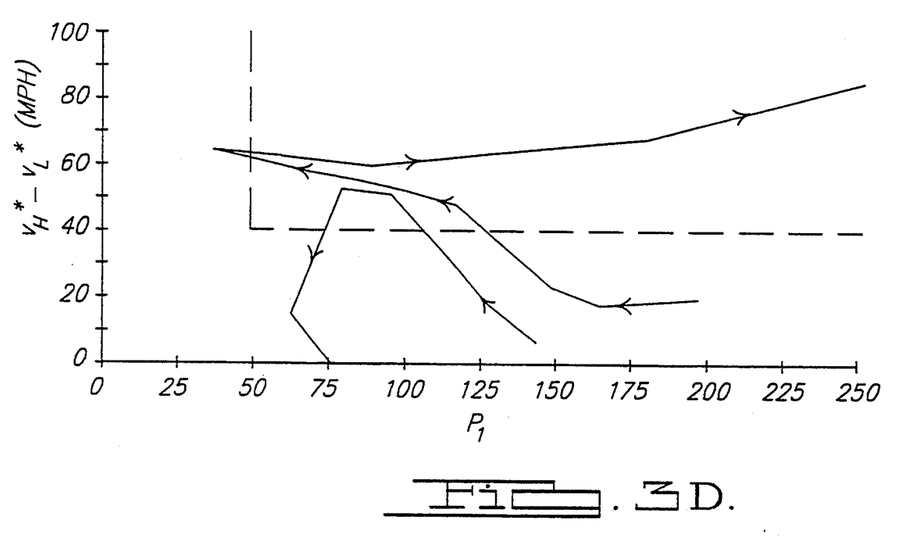
Figure 4A:
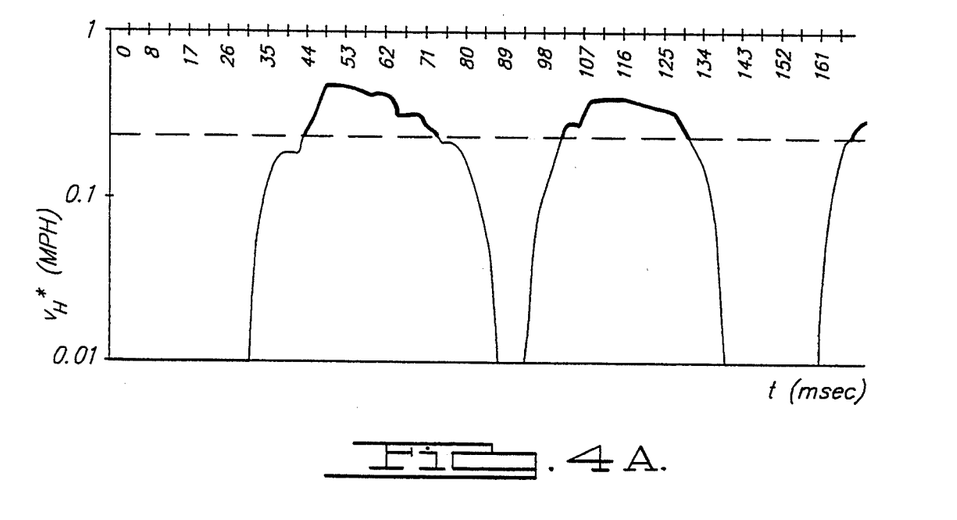
Figure 4B:
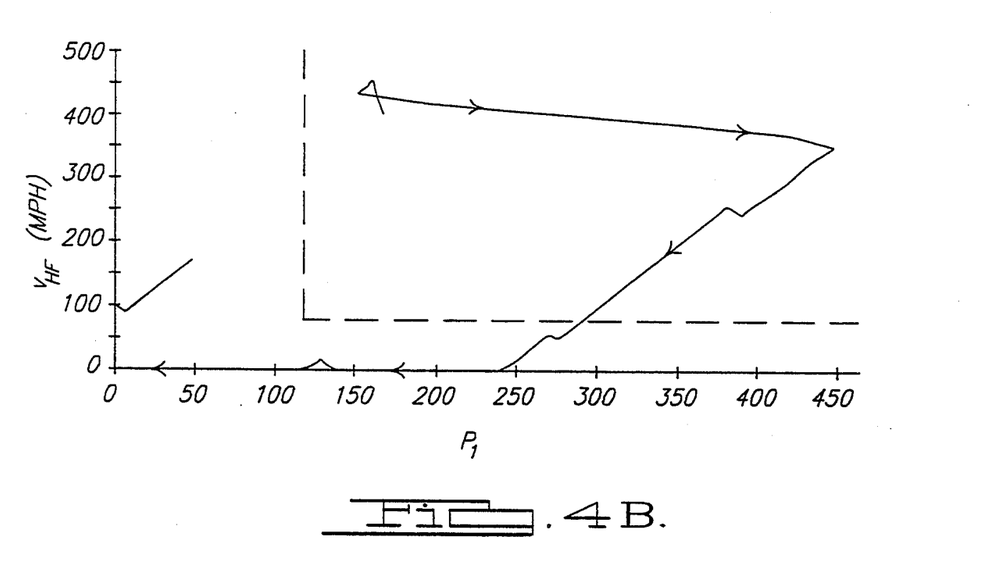
Figure 4C:
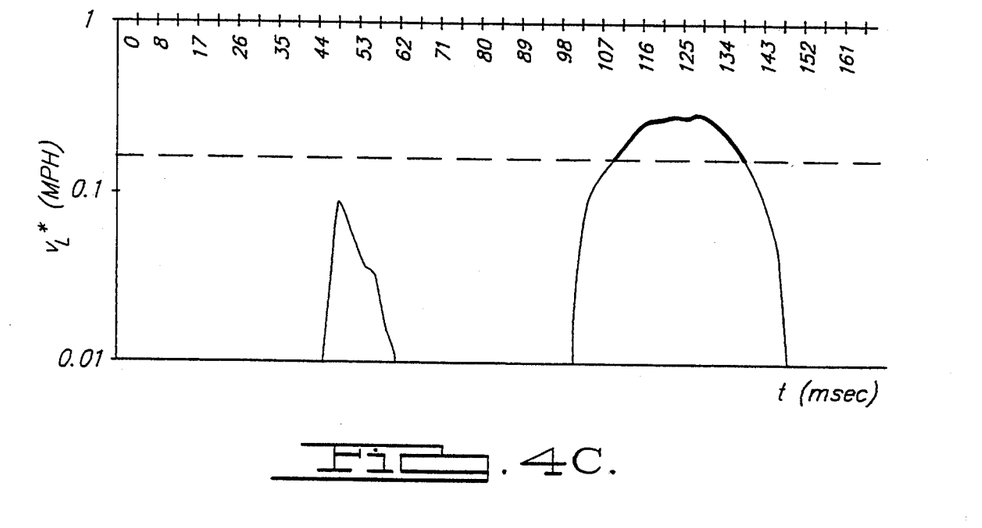
Figure 4D:
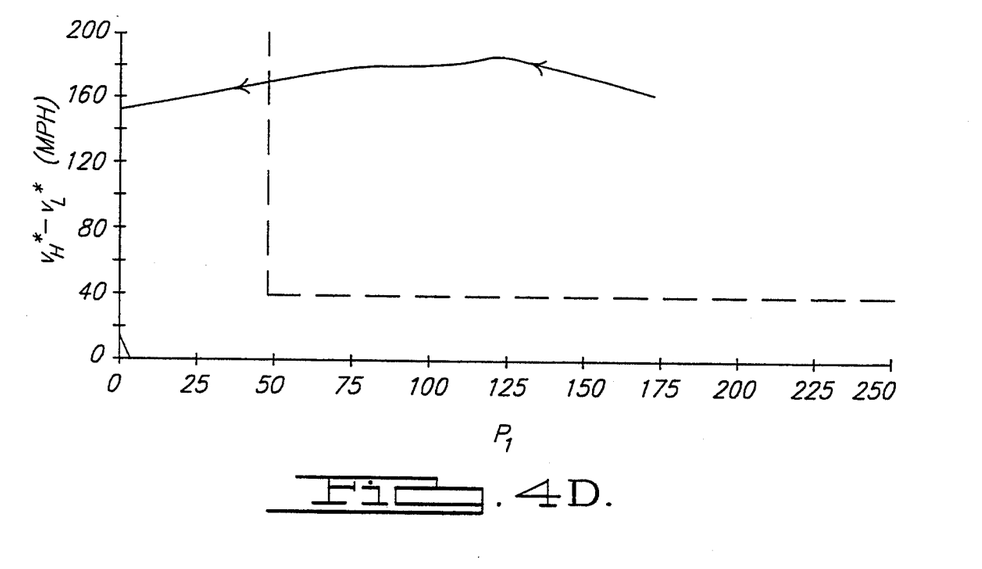
Figure 5A:
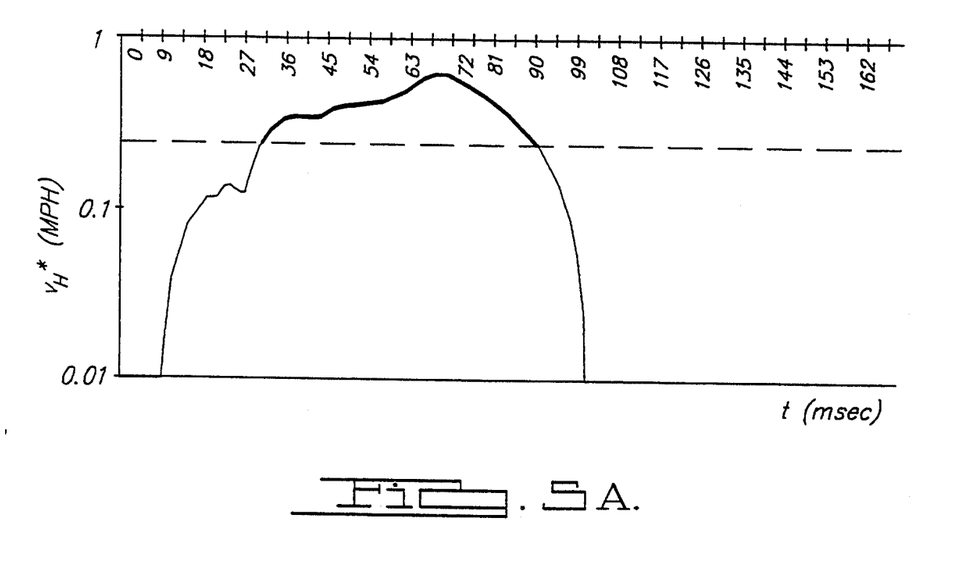
Figure 5B:
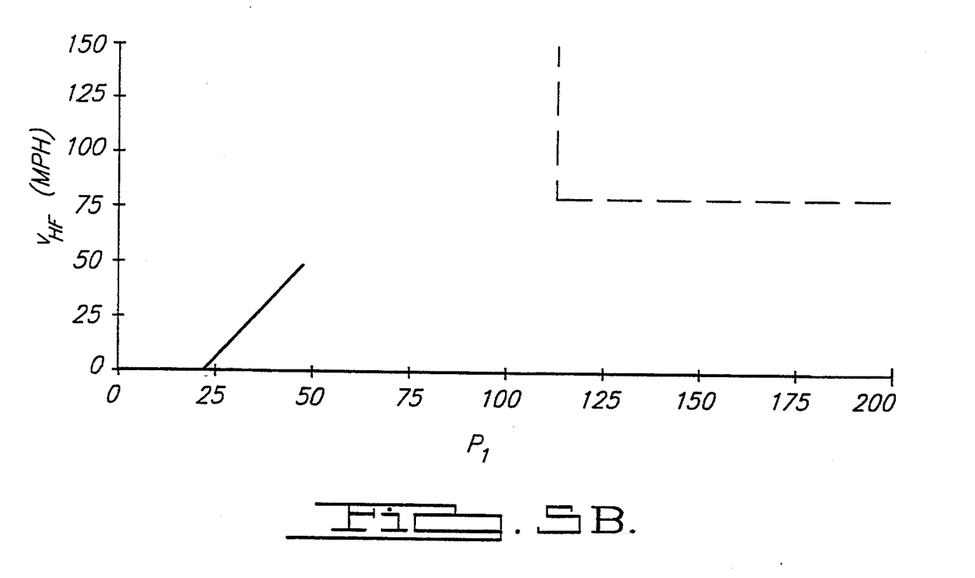
Figure 5C:
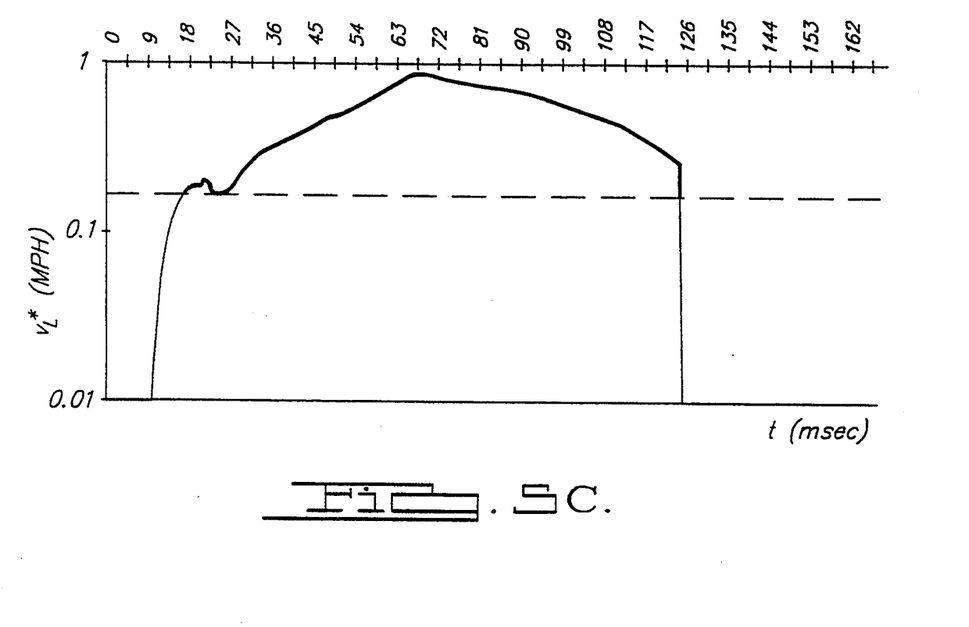
Figure 5D:
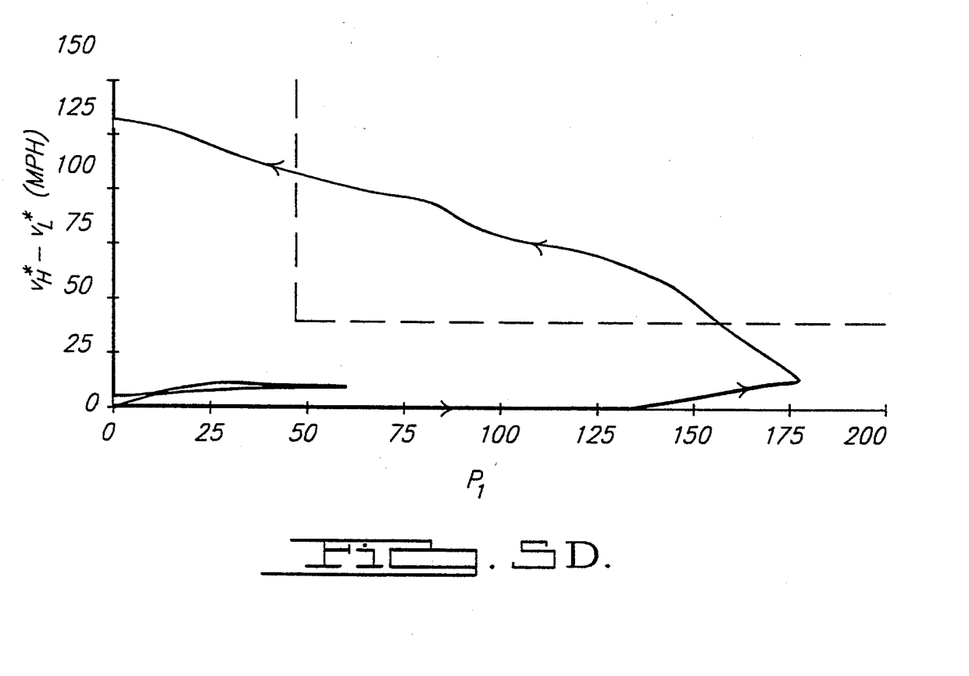

FIGS. 3A, 4A, and 5A depicts the first modified velocity value $v_L^*$ as it crosses its threshold value TIME1. FIGS. 3B, 4B, and 5B show a two-dimensional plot of predicted acceleration value $P_1$ versus the high variant past history value $P_2$, with the curve representing their respective values in absolute time and turning into a different shade when the "time" threshold TIME1 has been reached. Similarly, FIGS. 3C, 4C, and 5C, and FIGS. 3D, 4D, and 5D contain plots for TIME2 and the two dimensional plot of predicted acceleration value $P_1$ versus the high-frequency velocity $v_{HF}$, respectively.

While the preferred embodiment of the invention has been disclosed, it should be appreciated that the invention is susceptible of modification without departing from the spirit of the invention or the scope of the subjoined claims.

I claim:

1. A system for actuating a vehicle safety device in the event of a vehicle crash or sudden vehicle deceleration comprises:
   means for generating sampled data representative of the instantaneous acceleration of said vehicle;
   a RAM for storing consecutive values of said acceleration data;

means for calculating a low-variance jerk value from said stored data set;

means for calculating a high-variance jerk value from said stored data set;

means for calculating at least one modified velocity value from said stored data set;

means for calculating a predicted acceleration value using said low-variance jerk value;

means for calculating a high-frequency velocity value using said low-variance jerk value;

means for calculating a high-variance velocity value using said high-variance jerk value; and means responsive to said values for modified velocity, predicted acceleration, high-frequency velocity, and high-variance velocity for actuating said vehicle safety device when at least two of said values exceed threshold values therefor.

2. A method for actuating a vehicle safety device in the event of a vehicle crash or sudden vehicle deceleration comprising the steps of:

receiving information representative of instantaneous vehicle acceleration;

storing said received acceleration information in a RAM;

generating a low-variance jerk value from said stored acceleration information;

generating a high-variance jerk value from said stored acceleration information;

generating a first velocity value and a second velocity value using said stored acceleration information;

generating a predicted acceleration value using said low-variance jerk value;

generating a high-frequency past history value using said low-variance jerk value;

generating a high-variance past history value using said high-variance jerk value; and actuating said vehicle safety device if, while said first velocity value exceeds a first threshold value, said predicted acceleration value has exceeded a second threshold value and said high-variance velocity value has exceeded a second threshold value; and while said second velocity value exceeds a fourth threshold value, said predicted acceleration value has exceeded a fifth threshold value and said high-frequency past history measure has exceeded a sixth threshold value.

3. The method of claim 2, wherein said step of generating said low-variance jerk value from said stored acceleration information includes the steps of:

separating said stored acceleration information into a first data set and a second data set, said first data set containing older received acceleration information than said second data set;

rank-order filtering said stored acceleration information in said first data set and said second data set, respectively;

inverting a value of said stored acceleration information having a given rank in said first data set; and combining a value of said stored acceleration information having a rank in said second data set equal to said given rank with said inverted value of said acceleration information having said given rank in said first data set.

4. The method of claim 2, wherein said step of generating a high-variance jerk value from said stored acceleration information includes the steps of:

rank-order filtering said stored acceleration information;

inverting a low-rank value of said stored acceleration information; and combining a high-rank value of said stored acceleration information with said inverted low-rank value of said stored acceleration information.

5. The method of claim 2, wherein said step of generating said first and second velocity measures using said received acceleration information includes the steps of:

rank-order filtering said stored acceleration information; and integrating a low-rank value of said stored acceleration information to obtain said first velocity measure; and integrating stored acceleration information having a high rank and stored acceleration having a high rank.

6. The method of claim 5, including the step of modifying said rank-order filtered acceleration information prior to said integrating step.

7. The method of claim 6, wherein said step of modifying said rank-order filtered acceleration information includes the steps of:

generating a modification factor using at least one of the group consisting of a predetermined constant, said received acceleration information, said first velocity value, said second velocity value, said low-variance jerk value and said high-variance jerk value; and subtracting said modification factor from said rank-order filtered acceleration information.

8. The method of claim 2, wherein said step of generating said predicted acceleration value using said low-variance jerk value includes the steps of:

accumulating said low-variance jerk value over time to obtain a first accumulated value for low-variance jerk; and periodically subtracting a damp factor from said first accumulated value for low-variance jerk to obtain said predicted acceleration value.

9. The method of claim 8, wherein said low-variance jerk value is added to said first accumulated value for low-variance jerk only when the absolute value of said low-variance jerk value exceeds a seventh threshold value.

10. The method of claim 8, including the step of weighting said low-variance jerk value using a relatively high-rank value of said stored acceleration information.

11. The method of claim 2, wherein said step of generating said high-frequency past history value using said low-variance jerk value includes the steps of:

accumulating said low-variance jerk value over time to obtain a second accumulated value for low-variance jerk; and periodically subtracting a damp factor from said second accumulated value for low-variance jerk to obtain said high-frequency past history value.

12. The method of claim 11, wherein said low-variance jerk value is added to said second accumulated value for low-variance jerk only when the absolute value of said low-variance jerk value exceeds a eighth threshold value.

13. The method of claim 11, including the step of weighting said low-variance jerk value using a relatively low-rank value of said stored acceleration information.

14. The method of claim 2, wherein said step of generating said high-variance past history value using said high-variance jerk value includes the steps of:

accumulating said high-variance jerk value over time to obtain an accumulated value for said high-variance jerk; and periodically subtracting a damp factor from said accumulated value for said high-variance jerk to obtain said high-frequency past history value.

15. The method of claim 14, wherein said high-variance jerk value is added to said accumulated value for said high-variance jerk only when the absolute value of said high-variance jerk value exceeds a ninth threshold value.

16. The method of claim 2, further including the step of actuating said vehicle safety device if, while said first velocity value exceeds a tenth threshold value and said second velocity value exceeds an eleventh threshold value, said predicted acceleration value exceeds a twelfth threshold value.

17. A system for controlling actuation of a vehicle safety device in an event of a vehicle crash or sudden vehicle deceleration comprising:

means for receiving information representative of instantaneous vehicle acceleration;

means for storing said received acceleration information;

means for generating a low-variance jerk value from said stored acceleration information;

means for generating a high-variance jerk value from said stored acceleration information;

means for generating a first velocity value and a second velocity value using said stored acceleration information;

means for generating a predicted acceleration value using said low-variance jerk value;

means for generating a high-frequency past history value using said low-variance jerk value;

means for generating a high-variance past history value using said high-variance jerk value; and means for actuating said vehicle safety device if, while said first velocity value exceeds a first threshold value, said predicted acceleration value has exceeded a second threshold value and said high-variance velocity value has exceeded a second threshold value; and, while said second velocity value exceeds a fourth threshold value, said predicted acceleration value has exceeded a fifth threshold value and said high-frequency past history measure has exceeded a sixth threshold value.

18. The system of claim 17, wherein said means for generating said low-variance jerk value from said stored acceleration information includes:

means for separating said stored acceleration information into a first data set and a second data set, said first data set containing older received acceleration information than said second data set;

means for rank-order filtering said stored acceleration information in said first data set and said second data set, respectively;

means for inverting a value of said stored acceleration information having a given rank in said first data set; and means for combining a value of said stored acceleration information having a rank in said second data set equal to said given rank with said inverted value of said acceleration information having said given rank in said first data set.

19. The system of claim 17, wherein said means for generating a high-variance jerk value from said stored acceleration information includes:

means for rank-order filtering said stored acceleration information;

means for inverting a low-rank value of said stored acceleration information; and means for combining a high-rank value of said stored acceleration information with said inverted low-rank value of said stored acceleration information.

20. The system of claim 17, wherein said means for generating said first and second velocity measures using said received acceleration information includes:

means for rank-order filtering said stored acceleration information; and means for integrating a low-rank value of said stored acceleration information to obtain said first velocity measure; and means for integrating stored acceleration information having a high rank and stored acceleration having a high rank.

21. The system of claim 20, including means for modifying said rank-order filtered acceleration information prior to integrating in said integrating means.

22. The system of claim 21, wherein said means for modifying said rank-order filtered acceleration information includes:

means for generating a modification factor using at least one of the group consisting of a predetermined constant, said received acceleration information, said first velocity value, said second velocity value, said low-variance jerk value and said high-variance jerk value; and means for subtracting said modification factor from said rank-order filtered acceleration information.

23. The system of claim 17, wherein said means for generating said predicted acceleration value using said low-variance jerk value includes the steps of:

means for accumulating said low-variance jerk value over time to obtain a first accumulated value for low-variance jerk; and means for periodically subtracting a damp factor from said first accumulated value for low-variance jerk to obtain said predicted acceleration value.

24. The system of claim 23, wherein said low-variance jerk value is added to said first accumulated value for low-variance jerk only when the absolute value of said low-variance jerk value exceeds a seventh threshold value.

25. The system of claim 23, including means for weighting said low-variance jerk value using a relatively high-rank value of said stored acceleration information.

26. The system of claim 17, wherein said means for generating said high-frequency past history value using said low-variance jerk value includes:

means for accumulating said low-variance jerk value over time to obtain a second accumulated value for low-variance jerk; and means for periodically subtracting a damp factor from said second accumulated value for low-variance jerk to obtain said high-frequency past history value.

27. The system of claim 26, wherein said low-variance jerk value is added to said second accumulated value for low-variance jerk only when the absolute value of said low-variance jerk value exceeds a eighth threshold value.

28. The system of claim 26, including means for weighting said low-variance jerk value using a relatively low-rank value of said stored acceleration information.

29. The system of claim 17, wherein said means for generating said high-variance past history value using said high-variance jerk value includes:
   means for accumulating said high-variance jerk value over time to obtain an accumulated value for said high-variance jerk; and
   means for periodically subtracting a damp factor from said accumulated value for said high-variance jerk to obtain said high-frequency past history value.

30. The system of claim 29, wherein said high-variance jerk value is added to said accumulated value for said high-variance jerk only when the absolute value of said high-variance jerk value exceeds a ninth threshold value.

31. The system of claim 17, further including means for actuating said vehicle safety device if, while said first velocity value exceeds a tenth threshold value and said second velocity value exceeds an eleventh threshold value, said predicted acceleration value exceeds a twelfth threshold value.

* * * * *